US012070960B2

(12) United States Patent
Nunokawa

(10) Patent No.: US 12,070,960 B2
(45) Date of Patent: Aug. 27, 2024

(54) RECORDING DEVICE AND CONTROL METHOD FOR RECORDING DEVICE

(71) Applicant: SEIKO EPSON CORPORATION, Tokyo (JP)

(72) Inventor: Yohei Nunokawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 114 days.

(21) Appl. No.: 18/052,999

(22) Filed: Nov. 7, 2022

(65) Prior Publication Data

US 2023/0150285 A1 May 18, 2023

(30) Foreign Application Priority Data

Nov. 10, 2021 (JP) ................................ 2021-183431

(51) Int. Cl.
*B41J 11/00* (2006.01)
*B41J 25/308* (2006.01)
*B41J 29/393* (2006.01)
*B41J 29/46* (2006.01)

(52) U.S. Cl.
CPC ......... *B41J 29/393* (2013.01); *B41J 11/0095* (2013.01); *B41J 25/3082* (2013.01); *B41J 29/46* (2013.01)

(58) Field of Classification Search
None
See application file for complete search history.

(56) References Cited

U.S. PATENT DOCUMENTS

2019/0366710 A1* 12/2019 Sato ....................... B41J 19/207
2020/0290375 A1 9/2020 Yamashita et al.
2022/0234346 A1* 7/2022 Kobayashi ............... B41J 11/06

FOREIGN PATENT DOCUMENTS

EP 3689622 A1 * 8/2020 ............ B41J 11/009
JP 2020-146884 A 9/2020

OTHER PUBLICATIONS

Igarashi, MachineTranslationofEP-3689622-A1, 2020 (Year: 2020).*

* cited by examiner

*Primary Examiner* — Scott A Richmond
(74) *Attorney, Agent, or Firm* — WORKMAN NYDEGGER

(57) ABSTRACT

A recording device includes a recorder, a placement portion, an adjustment mechanism, a movement mechanism, a medium detector, an input portion, a notification portion, and storage. The recorder performs a positional information notification operation of causing the notification portion to notify positional information of the placement portion in a first direction based on identification information of a medium input by the input portion and correspondence information stored in the storage, and a detection result notification operation including moving the placement portion so that an entire region in the second direction of the placement portion passes through a detection position, causing the medium detector to detect whether the medium is located at a reference position during when the medium is passing through the detection position, and causing the notification portion to notify information based on a result of the detection by the medium detector.

8 Claims, 14 Drawing Sheets

RECORDING DEVICE AND CONTROL METHOD FOR RECORDING DEVICE

The present application is based on, and claims priority from JP Application Serial Number 2021-183431, filed Nov. 10, 2021, the disclosure of which is hereby incorporated by reference herein in its entirety.

BACKGROUND

1. Technical Field

The present disclosure relates to a recording device and a control method for a recording device.

2. Related Art

Recording devices of various configurations have been used. Among such recording devices, there is a recording device that is provided with a placement portion on which a medium is placed and that is capable of changing the position of the placement portion in accordance with the thickness of the medium. For example, in JP-A-2020-146884, a printing apparatus is disclosed that is capable of moving a tray on which a medium is placed in a facing direction, in which the tray and a printing head face each other, by rotating a lever. In addition, the printing apparatus is capable of detecting the position of the tray in the facing direction.

The printing apparatus disclosed in JP-A-2020-146884 is convenient because it can detect the position of the tray in the facing direction. However, in a recording device that performs recording on a fabric, such as clothes, as a medium, media of various thicknesses are used. Therefore, with this recording device, a large workload has been required for adjusting the height of a placement portion in a height direction, which is a facing direction in which the placement portion and a recorder face each other. This is because, in the known recording device capable of changing the position of the placement portion in accordance with the thickness of the medium, such an operation as described below needs to be repeatedly performed many times. Specifically, the operation involves adjusting the position of the placement portion on which the medium is set to a low position, causing the placement portion to reciprocate over the entire region in the front-rear direction while checking the height thereof, adjusting the position of the placement portion on which the medium is set to a slightly higher position, causing the placement portion to reciprocate over the entire region in the front-rear direction while checking the height thereof, again adjusting the position of the placement portion on which the medium is set to a yet further slightly higher position, and causing the placement portion to reciprocate over the entire region in the front-rear direction while checking the height thereof.

SUMMARY

A recording device according to the present disclosure for solving the problem described above includes a placement portion configured to support a medium, a recorder configured to perform recording on the medium supported by the placement portion, an adjustment mechanism configured to adjust a position of the placement portion in a first direction being a direction in which the recorder and the placement portion face each other, a movement mechanism configured to move the placement portion in a second direction being a direction intersecting the first direction, a medium detector configured to detect, at a detection position within a movement range of the placement portion moved by the movement mechanism, whether the medium placed on the placement portion is at a reference position in the first direction, an input portion configured to receive an input, a notification portion configured to notify information, a storage configured to store correspondence information in which identification information of the medium and positional information of the placement portion in the first direction are associated with each other, and a controller. When the position of the placement portion in the first direction is adjusted, the controller performs a positional information notification operation including causing the notification portion to notify the positional information of the placement portion in the first direction based on the identification information of the medium input by the input portion and the correspondence information stored in the storage, and performs, after the positional information notification operation, a detection result notification operation including causing the movement mechanism to move the placement portion, in accordance with a first instruction received by the input portion, so that an entire region in the second direction of the placement portion passes through the detection position, causing the medium detector to detect whether the medium is located at the reference position during when the medium is passing through the detection position, and causing the notification portion to notify information based on a result of the detection by the medium detector.

Further, in a control method for a recording device for solving the problem described above, the recording device includes a placement portion configured to support a medium, a recorder configured to perform recording on the medium supported by the placement portion, an adjustment mechanism configured to adjust a position of the placement portion in a first direction, the first direction being a direction in which the recorder and the placement portion face each other, a movement mechanism configured to move the placement portion in a second direction, the second direction being a direction intersecting the first direction, a medium detector configured to detect, at a detection position within a movement range of the placement portion moved by the movement mechanism, whether the medium placed on the placement portion is at a reference position in the first direction, an input portion configured to receive an input, a notification portion configured to notify information, and a storage configured to store correspondence information in which identification information of the medium and positional information of the placement portion in the first direction are associated with each other. The control method for the recording device includes, when adjusting the position of the placement portion in the first direction, performing a positional information notification operation, by the controller, of causing the notification portion to notify the positional information of the placement portion in the first direction based on the identification information of the medium input by the input portion and the correspondence information stored in the storage, and after the positional information notification operation, performing a detection result notification operation, by the controller, of moving the placement portion by the movement mechanism, in accordance with a first instruction received by the input portion, to cause an entire region in the second direction of the placement portion to pass through the detection position, causing the medium detector to detect whether the medium is at the reference position while the medium is passing through the detection position, and causing the notification portion to notify information based on a detection result of the medium detector.

DESCRIPTION OF EXEMPLARY EMBODIMENTS

Figure 1:
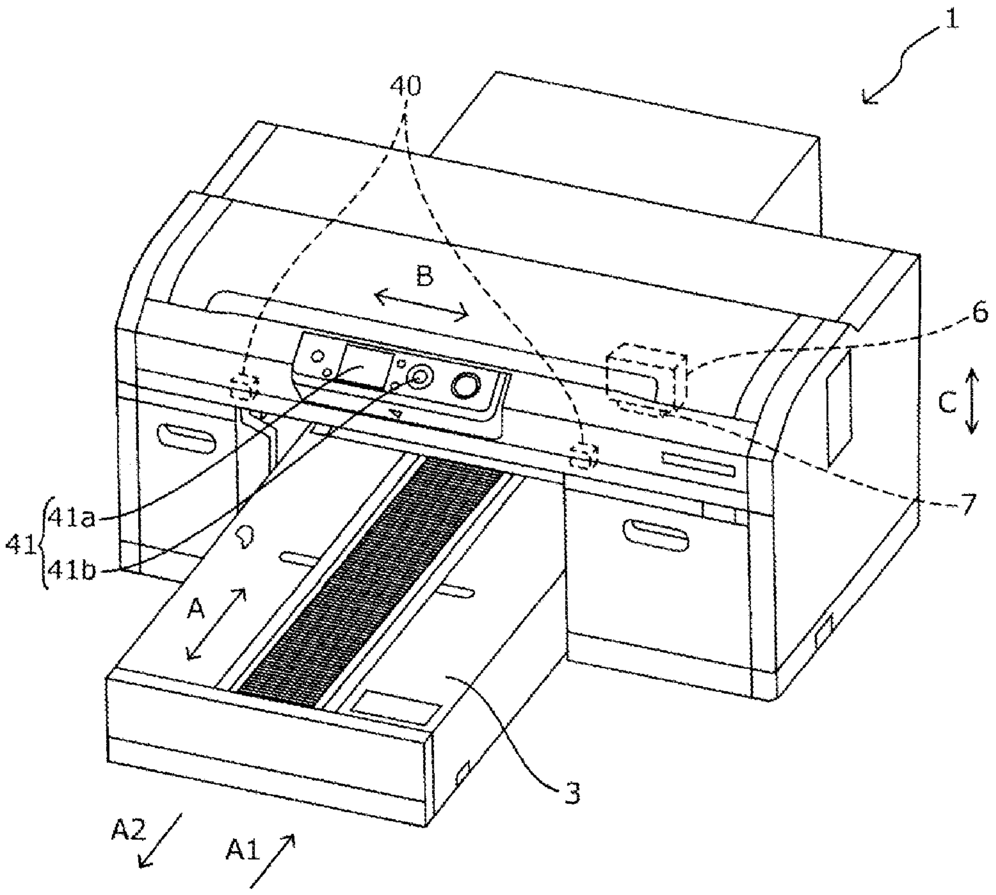
FIG. 1 is a schematic perspective view illustrating a recording device according to an example of the present disclosure.

First, the present disclosure will be schematically described.

A recording device according to a first aspect of the present disclosure for solving the problem described above includes a placement portion configured to support a medium, a recorder configured to perform recording on the medium supported by the placement portion, an adjustment mechanism configured to adjust a position of the placement portion in a first direction, the first direction being a direction in which the recorder and the placement portion face each other, a movement mechanism configured to move the placement portion in a second direction, the second direction being a direction intersecting the first direction, a medium detector configured to detect, at a detection position within a movement range of the placement portion moved by the movement mechanism, whether the medium placed on the placement portion is at a reference position in the first direction, an input portion configured to receive an input, a notification portion configured to notify information, a storage configured to store correspondence information in which identification information of the medium and positional information of the placement portion in the first direction are associated with each other, and a controller. When adjusting the position of the placement portion in the first direction, the controller performs a positional information notification operation of causing the notification portion to notify the positional information of the placement portion in the first direction based on the identification information of the medium input by the input portion and the correspondence information stored in the storage, and after the positional information notification operation, a detection result notification operation of moving the placement portion by the movement mechanism, in accordance with a first instruction received by the input portion, to cause an entire region in the second direction of the placement portion to pass through the detection position, causing the medium detector to detect whether the medium is at the reference position while the medium is passing through the detection position, and causing the notification portion to notify information based on a detection result of the medium detector.

According to this aspect, in the positional information notification operation, when adjusting the position of the placement portion in the first direction, the positional information of the placement portion in the first direction, based on the identification information of the medium input by the input portion and the correspondence information stored in the storage, is notified by the notification portion. In other words, since the adjustment of the height of the placement portion can be started from a position close to an appropriate height of the placement portion, the number of reciprocating movements of the placement portion in the second direction and the like can be reduced, and a workload associated with the height adjustment of the placement portion can thus be reduced.

With respect to the first aspect, in a recording device according to a second aspect of the present disclosure, the storage stores a setting condition of a post-processing device configured to perform post-processing on the medium on which the recording is performed by the recorder, and the controller causes the notification portion to notify the setting condition.

According to this aspect, the storage stores the setting condition of the post-processing device, and the controller causes the notification portion to notify the setting condition. Thus, the post-processing by the post-processing device can be swiftly started under an appropriate setting condition.

With respect to the first or second aspect, in a recording device according to a third aspect of the present disclosure, the controller is configured to update the correspondence information and cause the storage to store the correspondence information.

According to this aspect, the controller can update the correspondence information and cause the storage to store the correspondence information. Thus, for example, when more preferable correspondence information than the correspondence information stored in the storage is found, the height adjustment of the placement portion can be performed under a more preferable condition.

With respect to any one of the first to third aspect, in a recording device according to a fourth aspect of the present disclosure, when adjusting the position of the placement portion in the first direction, after performing the positional information notification operation and before the detection result notification operation, the controller performs a provisional detection result notification operation of causing the movement mechanism to move the placement portion to a first position, in accordance with a second instruction received by the input portion, to cause at least a portion of the placement portion to be located at the detection position, causing the medium detector to detect, at the first position, whether the medium is at the reference position, and causing the notification portion to notify information based on a detection result of the medium detector.

According to this aspect, after performing the positional information notification operation and before the detection result notification operation, in the provisional result notification operation, the placement portion is moved to the first position by the movement mechanism such that at least the portion of the placement portion is located at the detection position, the medium detector is caused to detect, at the first position, whether the medium is at the reference position, and the notification portion is caused to notify the information based on the detection result of the medium detector. In other words, the placement portion can be moved to the first position, and the height adjustment of the placement portion can be completed at the first position. Thus, the height adjustment of the placement portion can be completed without causing the placement portion to reciprocate in the second direction many times. As a result, the workload associated with the height adjustment of the placement portion can be reduced.

With respect to the fourth aspect, in a recording device according to a fifth aspect of the present disclosure, after performing the positional information notification operation and before the detection result notification operation, the controller causes the notification portion to notify information prompting performing of the provisional detection result notification operation.

According to this aspect, after performing the positional information notification operation and before the detection result notification operation, the controller causes the notification portion to notify the information to cause the provisional detection result notification operation to be performed. Thus, the provisional detection result notification operation is performed without fail.

With respect to the fourth or fifth aspect, in a recording device according to a sixth aspect of the present disclosure, when a non-stored medium, for which the identification information is not stored in the storage, is used as the medium, the controller causes the notification portion to notify information prompting performing of the provisional detection result notification operation.

According to this aspect, when the non-stored medium is used, the controller can cause the notification portion to notify the information prompting performing of the provisional detection result notification operation. Thus, when the non-stored medium is used, for example, instead of performing the positional information notification operation, the provisional detection result notification operation can be performed. As a result, even when the non-stored medium is used, the workload associated with the height adjustment of the placement portion can be reduced.

With respect to any one of the fourth to sixth aspects, a recording device according to a seventh aspect of the present disclosure includes a placement portion detector configured to detect a position of the placement portion in the first direction. In the recording device, the controller causes the notification portion to notify prompting adjustment of the position of the placement portion by the adjustment mechanism, after the medium detector detects that the medium is at the reference position in the provisional detection result notification operation, and until the position of the placement portion detected by the placement portion detector is at a position separated from the reference position by a first gap in a direction away from the recorder.

According to this aspect, the notification portion is caused to notify the information prompting the adjustment of the position of the placement portion by the adjustment mechanism, after the medium detector detects that the medium is at the reference position in the provisional detection result notification operation, and until the position of the placement portion detected by the placement portion detector is at the position separated from the reference position by the first gap in the direction away from the recorder of the first direction. Thus, the position of the placement portion in the first direction can be accurately adjusted using the detection result of the placement portion detector.

In a control method for a recording device according to an eighth aspect of the present disclosure, the recording device includes a placement portion configured to support a medium, a recorder configured to perform recording on the medium supported by the placement portion, an adjustment mechanism configured to adjust a position of the placement portion in a first direction, the first direction being a direction in which the recorder and the placement portion face each other, a movement mechanism configured to move the placement portion in a second direction, the second direction being a direction intersecting the first direction, a medium detector configured to detect, at a detection position within a movement range of the placement portion moved by the movement mechanism, whether the medium placed on the placement portion is at a reference position in the first direction, an input portion configured to receive an input, a notification portion configured to notify information, and a storage configured to store correspondence information in which identification information of the medium and positional information of the placement portion in the first direction are associated with each other. The control method for the recording device includes, when adjusting the position of the placement portion in the first direction, performing a positional information notification operation, by the controller, of causing the notification portion to notify the positional information of the placement portion in the first direction based on the identification information of the medium input by the input portion and the correspondence information stored in the storage, and after the positional information notification operation, performing a detection result notification operation, by the controller, of moving the placement portion by the movement mechanism, in accordance with a first instruction received by the input portion, to cause an entire region in the second direction of the placement portion to pass through the detection position, causing the medium detector to detect whether the medium is at the reference position while the medium is passing through the detection position, and causing the notification portion to notify information based on a detection result of the medium detector.

According to this aspect, in the positional information notification operation, when adjusting the position of the placement portion in the first direction, the notification portion is caused to notify the positional information of the placement portion in the first direction based on the identification information of the medium input by the input portion and the correspondence information stored in the storage. In other words, since the adjustment of the height of the placement portion can be started from the position close to the appropriate height of the placement portion, the number of reciprocating movements of the placement portion in the second direction and the like can be reduced, and the workload associated with the height adjustment of the placement portion can thus be reduced.

Figure 2:
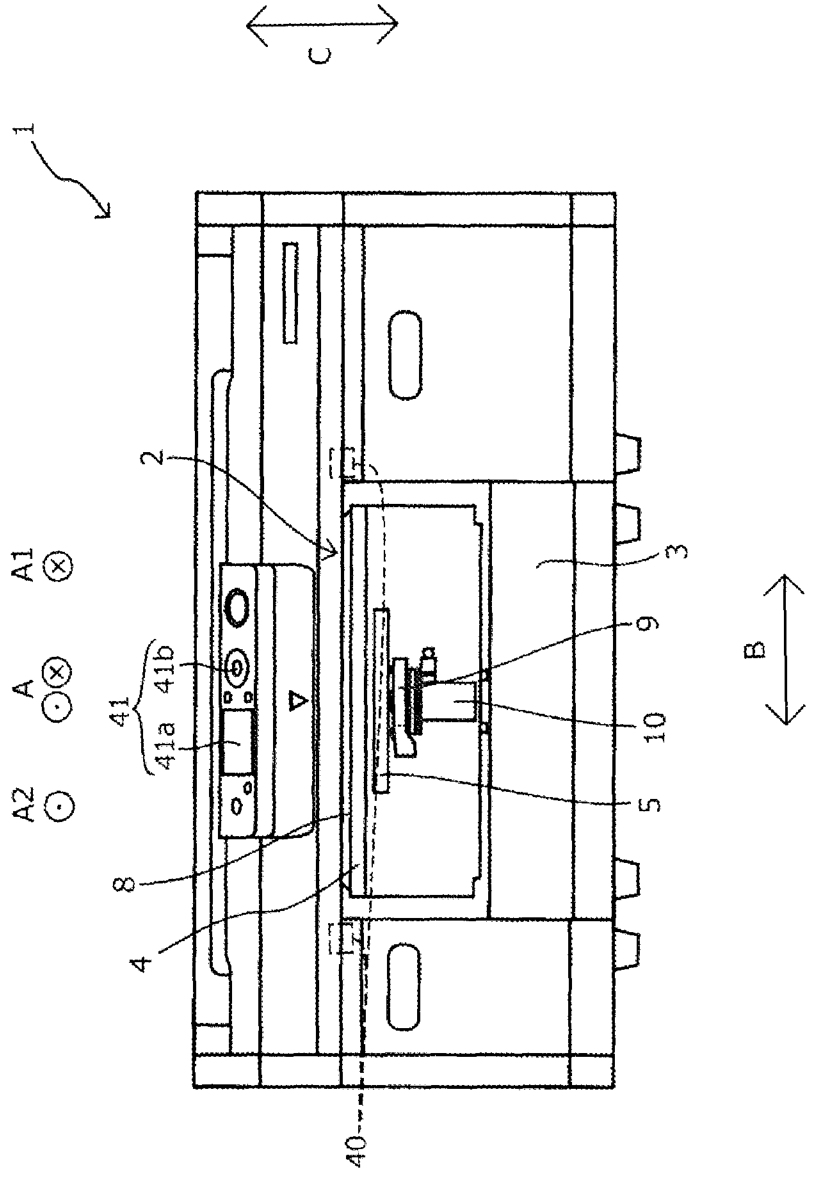
FIG. 2 is a schematic front view illustrating the recording device according to the example of the present disclosure.
Figure 3:
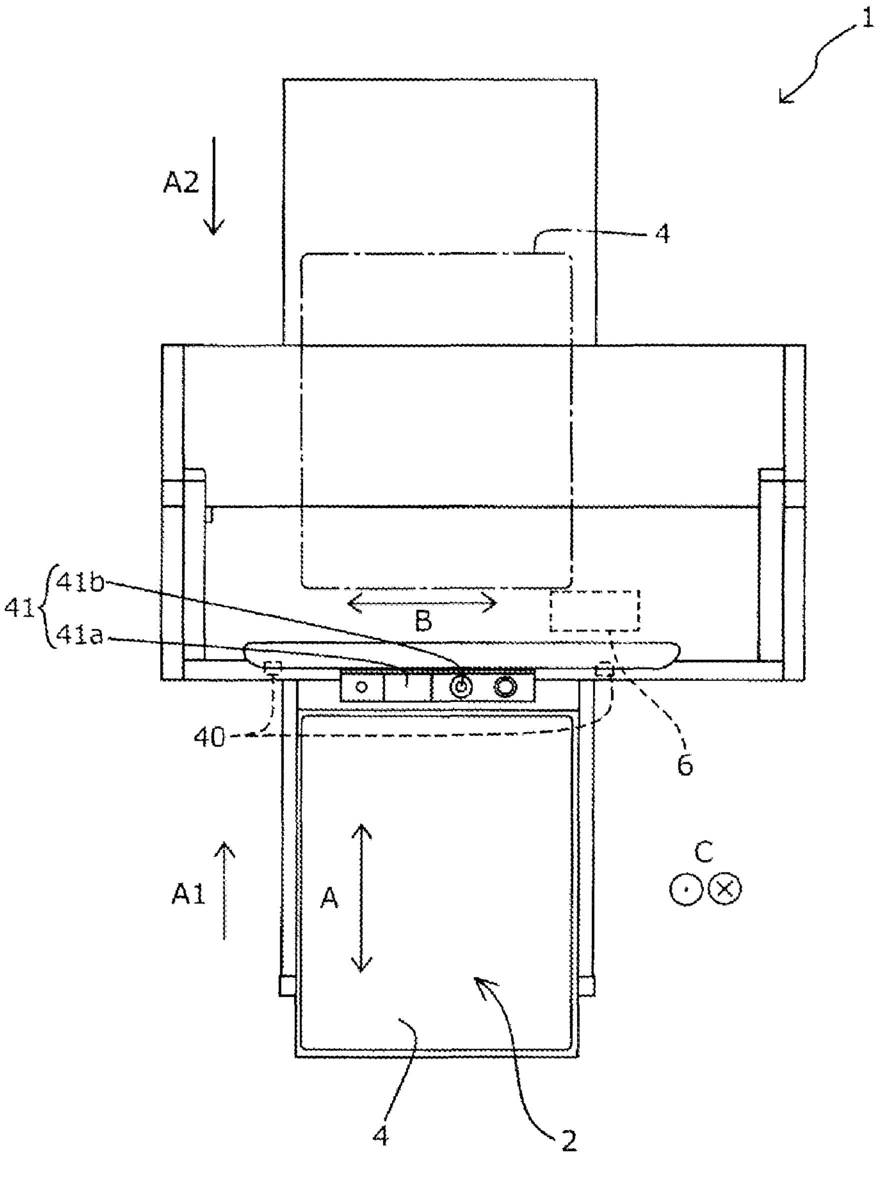
FIG. 3 is a schematic plan view illustrating the recording device according to the example of the present disclosure.

Hereinafter, a recording device 1 according to an example of the present disclosure will be described in detail with reference to the appended drawings. First, an outline of the recording device 1 according to this example will be described mainly with reference to FIG. 1 to FIG. 3. FIG. 1 is a schematic perspective view of the recording device 1, FIG. 2 is a schematic front view of the recording device 1, and FIG. 3 is a schematic plan view of the recording device 1. Note that FIG. 1 to FIG. 3 each illustrate a state in which some of constituent members are illustrated in a simplified manner.

The recording device 1 according to this example is specifically an ink-jet printer. The recording device 1 includes a medium support unit 2 that moves in a movement direction A in a state of supporting a medium. The medium support unit 2 includes a tray 4, which serves as a placement portion that supports the medium while the medium is placed on a placement surface 8. The recording device 1 includes a medium transport unit 3, which serves as a movement mechanism that transports the medium supported by the tray 4 in the movement direction A. The movement direction A is a direction including a direction A1 and a direction A2 opposite from the direction A1. Further, the tray 4 is detachably placed on a stage 5, which serves as a base portion. Here, an attachment/detachment direction of the tray 4 with respect to the stage 5 corresponds to the vertical direction with respect to the recording device 1 according to this example. A lever 9 is a component for adjusting the height of the tray 4, namely, a distance between the tray 4 and a recording head 7 in a facing direction C. Here, the facing direction C refers to a direction in which the tray 4 and the recording head 7 face each other at a time of recording.

Figure 7:
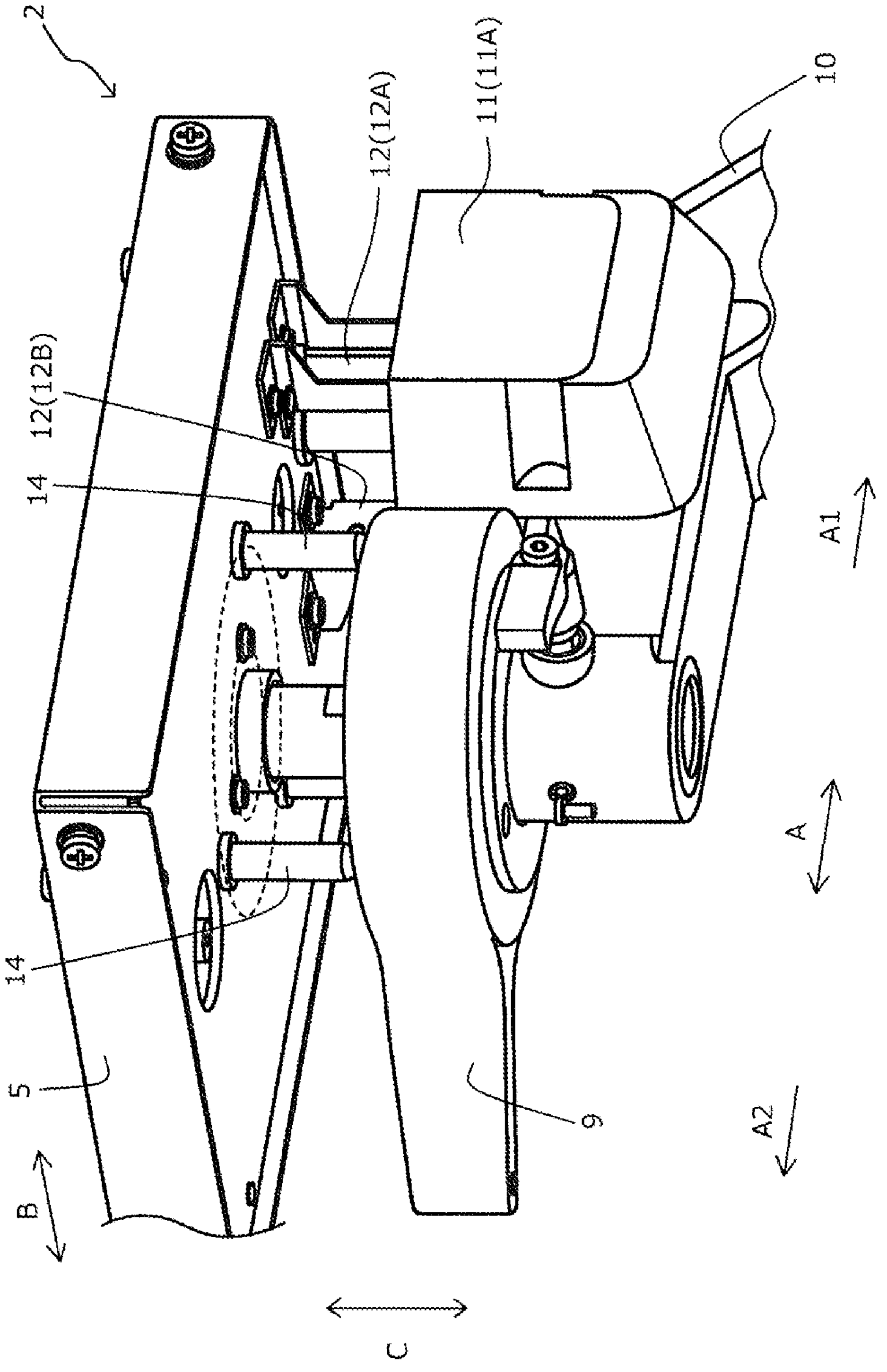
FIG. 7 is a schematic perspective view, viewed from a different angle from that of FIG. 6, illustrating the periphery of the tray position detector of the recording device according to the example of the present disclosure.
Figure 8:
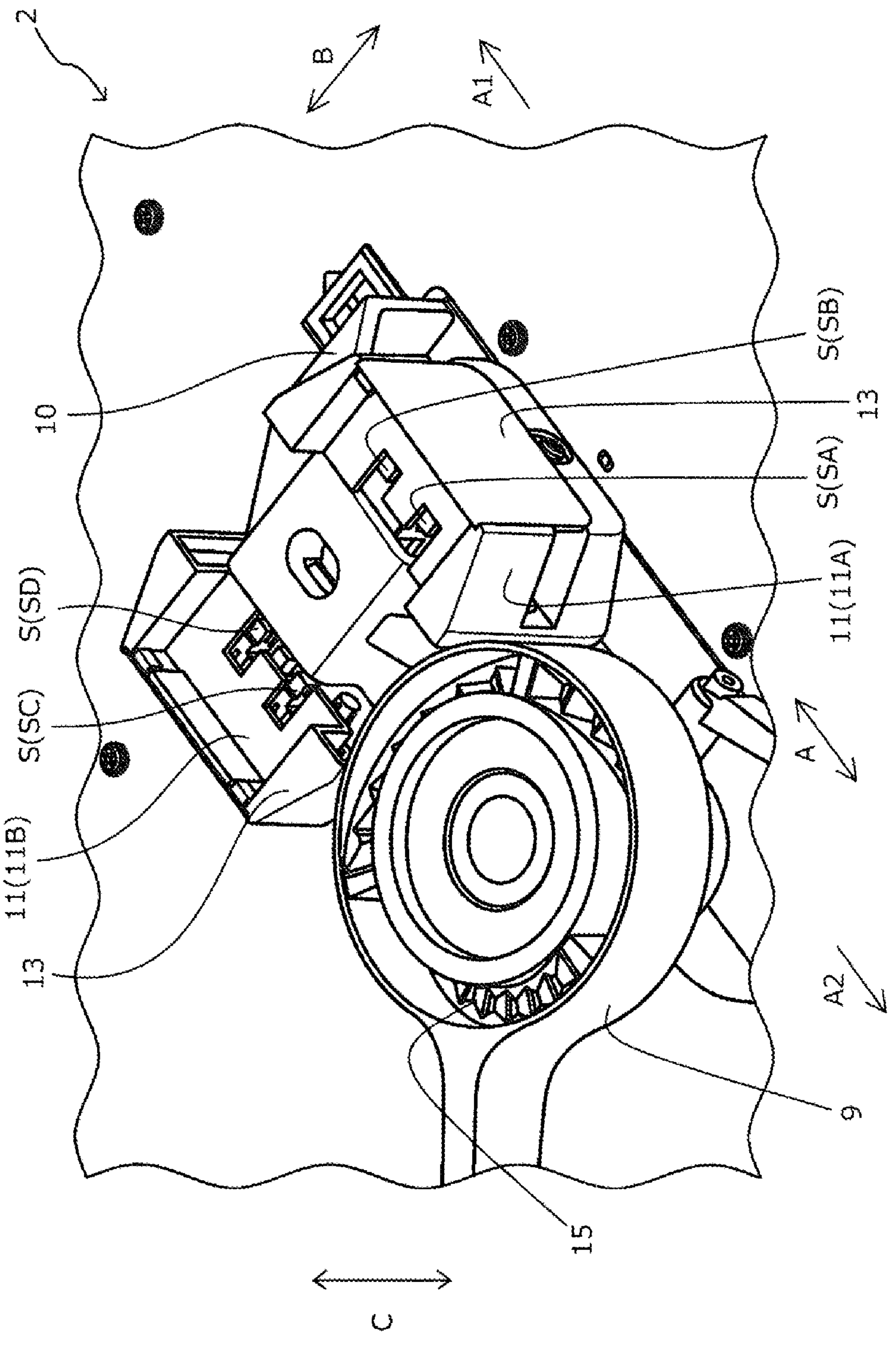
FIG. 8 is a schematic perspective view illustrating the periphery of the tray position detector of the recording device according to the example of the present disclosure.

As illustrated in FIG. 7 and the like, the stage 5 includes a protrusion portion 14 extending downward in the vertical direction. Further, a stepped protrusion portion placement portion 15, which is illustrated in FIG. 8, is formed inside the lever 9. The protrusion portion placement portion 15 is a portion at which the protrusion portion 14 of the stage 5 is placed. In other words, the lever 9 supports the stage 5 by supporting the protrusion portion 14 using the protrusion portion placement portion 15. Then, by rotating the lever 9, the position, at the protrusion portion placement portion 15, at which the protrusion portion 14 is placed is changed, and the tray 4 moves together with the stage 5 in a direction along the facing direction C. In this example, the facing direction C is a direction along the vertical direction. The lever 9 is manually operated by a user. Note that, as illustrated in FIG. 2, the lever 9 is provided at an arm portion 20 of the medium support unit 2. Further, as the medium, media formed from various materials including paper, a vinyl chloride resin, and the like can be used in addition to textile such as woven fabric and cloth.

As described above, the lever 9 is configured to be able to adjust a support position of the medium in the facing direction C by moving the tray 4 in the facing direction C. Therefore, the lever 9 can be considered to be an adjustment mechanism. In this example, the lever 9 is configured to move the tray 4 and the stage 5, which are a part of the medium support unit 2, but the configuration of the lever 9 is not limited to such a configuration. For example, the lever 9 may be configured to move only the tray 4.

Further, as illustrated in FIG. 1 to FIG. 3, inside a main body of the recording device 1, a medium detector 40 is provided that can detect the medium placed on the tray 4 at a predetermined position in the facing direction C. The medium detector 40 according to this example includes a light-emitting portion and a light-receiving portion both of which are disposed along a width direction B, and is configured to be able to detect the medium in a non-contact manner based on whether light irradiated from the light-emitting portion has been received by the light-receiving portion. However, the medium detector 40 is not limited to such a configuration, and, for example, may include a contact portion with respect to the medium and be configured to be able to detect the medium based on whether the contact portion has come into contact with the medium placed on the tray 4.

Further, as illustrated in FIG. 1 to FIG. 3, an operation panel 41 including a display portion 41*a* and various buttons 41*b* is formed at the recording device 1, and various pieces of information such as a detection result of the medium detector 40 are displayed on the display portion 41*a* of the operation panel 41. Then, in accordance with the content of the information displayed on the display portion 41*a*, the user can input various types of instruction using the various buttons 41*b* or display buttons displayed on the display portion 41*a*. The various buttons 41*b* serve as an input portion that inputs information, but the display portion 41*a* also serves as the input portion because the display portion 41*a* can also display the display buttons and the like.

Further, inside the main body of the recording device 1, the recording head 7 is provided that serves as a recorder and can form an image on the medium by ejecting ink, which is an example of a liquid. “Forming an image on the medium” can be rephrased as “recording an image on the medium”. Note that, in this example, an ejection direction, which is a direction in which the ink is ejected from the recording head 7, is the direction along the vertical direction. Note that the ink is supplied from a plurality of ink cartridges, one each of which is provided for each color, to the recording head 7. The recording device 1 according to this example can cause the carriage 6, at which the recording head 7 is provided, to reciprocate in the width direction B intersecting the movement direction A. The recording device 1 forms a desired image by ejecting the ink from the recording head 7 onto the medium supported by the tray 4 while causing the recording head 7 to reciprocate in the width direction B.

Note that, in the recording device 1 according to the example, the front side, which is the lower-left direction in FIG. 1, corresponds to a set position P1 at which the medium is set on the tray 4. Then, the recording device 1 moves the tray 4 on which the medium is set in the direction A1 of the movement direction A until the tray 4 reaches a recording start position P2 on the rear side, which is the upper-right direction in FIG. 1, and then, performs recording on the medium while moving the tray 4 in the direction A2 of the movement direction A. In FIG. 3, the tray 4 indicated by a solid line represents a state in which the tray 4 is at the set position P1, and the tray 4 indicated by an alternate long and short dash line represents a state in which the tray 4 is at the recording start position P2. Note that a detection position of the medium by the medium detector 40 is located on the direction A2 side, which is the set position P1 side inside the main body of the recording device 1, and a facing position facing the recording head 7, which reciprocates in the width direction B, is located on the direction A1 side, which is closer to the recording start position P2 side than to the medium detector 40.

The recording device 1 according to this example includes the recording head 7 that records an image while reciprocating in the width direction B, but the recording device 1 may include a so-called line head provided with a plurality of nozzles configured to eject ink and aligned in an intersecting direction intersecting the movement direction of the medium. Here, a "line head" is a recording head which is used in a recording device configured to form an image by relatively moving the recording head or the medium with respect to the other, and in which a region of the nozzles formed in the intersecting direction intersecting the movement direction of the medium can cover the entirety of the intersecting direction. Note that the region of the nozzles in the intersecting direction need not necessarily be able to cover the entirety of the intersecting direction for all types of media that can be used in the recording device. Further, although the recording head 7 according to the example is the recorder that can record an image on the medium by ejecting the ink, the recording head 7 is not limited to such a recorder, and, for example, may be a transfer-type recorder that transfers a color material onto a medium to record an image.

Figure 4:
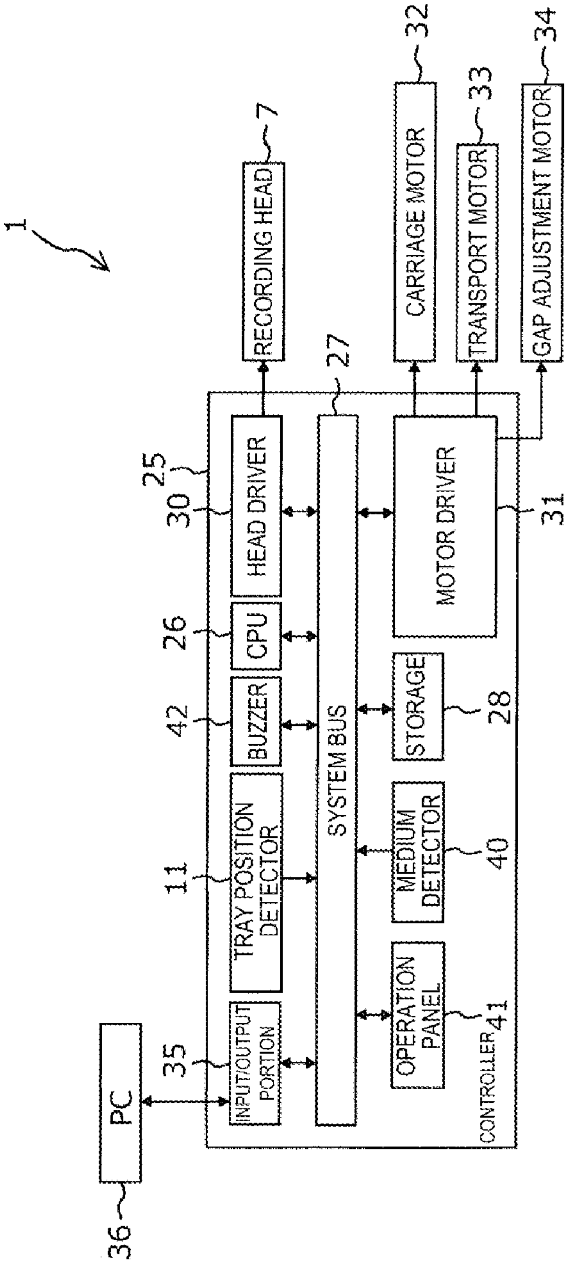
FIG. 4 is a block diagram illustrating the recording device according to the example of the present disclosure.

Next, an electrical configuration of the recording device 1 according to this example will be described. FIG. 4 is a block diagram of the recording device 1. The recording device 1 includes a controller 25 that controls various operations. The controller 25 includes a CPU 26 that manages overall control of the recording device 1. The CPU 26 is coupled, via a system bus 27, to a storage 28 that stores correspondence information in which various control programs executed by the CPU 26 and identification information of the medium are associated with positional information of the tray 4 in the facing direction C, and the like. The storage 28 includes a ROM that is a non-volatile storage storing data, a RAM 29 that can temporarily store data, an EEPROM that can update and store data, and the like.

Further, the CPU 26 is coupled, via the system bus 27, to a head driver 30 for driving the recording head 7. Further, the CPU 26 is coupled, via the system bus 27, to a motor driver 31. Then, the motor driver 31 is coupled to a carriage motor 32 that causes the carriage 6 provided with the recording head 7 to move in the width direction B, and also to a transport motor 33 that transports the medium, namely, moves the tray 4 in the movement direction A.

Further, the CPU 26 is coupled, via the system bus 27, to the operation panel 41, the medium detector 40, and also to tray position detectors 11 and a buzzer 42, which will be described below. Furthermore, the CPU 26 is coupled to an input/output portion 35. Then, the input/output portion 35 is coupled to a PC 36. Note that the medium detector 40 and the tray position detector 11 are generally expensive, so not many of them are provided.

The controller 25 according to this example is configured as described above, and controls driving of each of constituent members such as the recording head 7, the carriage 6, and the tray 4 associated with a recording operation. Further, the controller 25 can cause each of the constituent members to perform an operation respectively corresponding thereto, such as an operation of determining the position of the stage 5 in the facing direction C based on a detection result of the tray position detector 11, and based on the determination result, adjusting an ejection timing of the ink from the recording head 7 in accordance with a gap between the recording head 7 and the medium. Furthermore, the controller 25 can prompt the user to input a desired instruction via the buttons 41*b* and the like by displaying, on the display portion 41*a*, various pieces of information such as the detection result of the medium detector 40.

Figure 5:
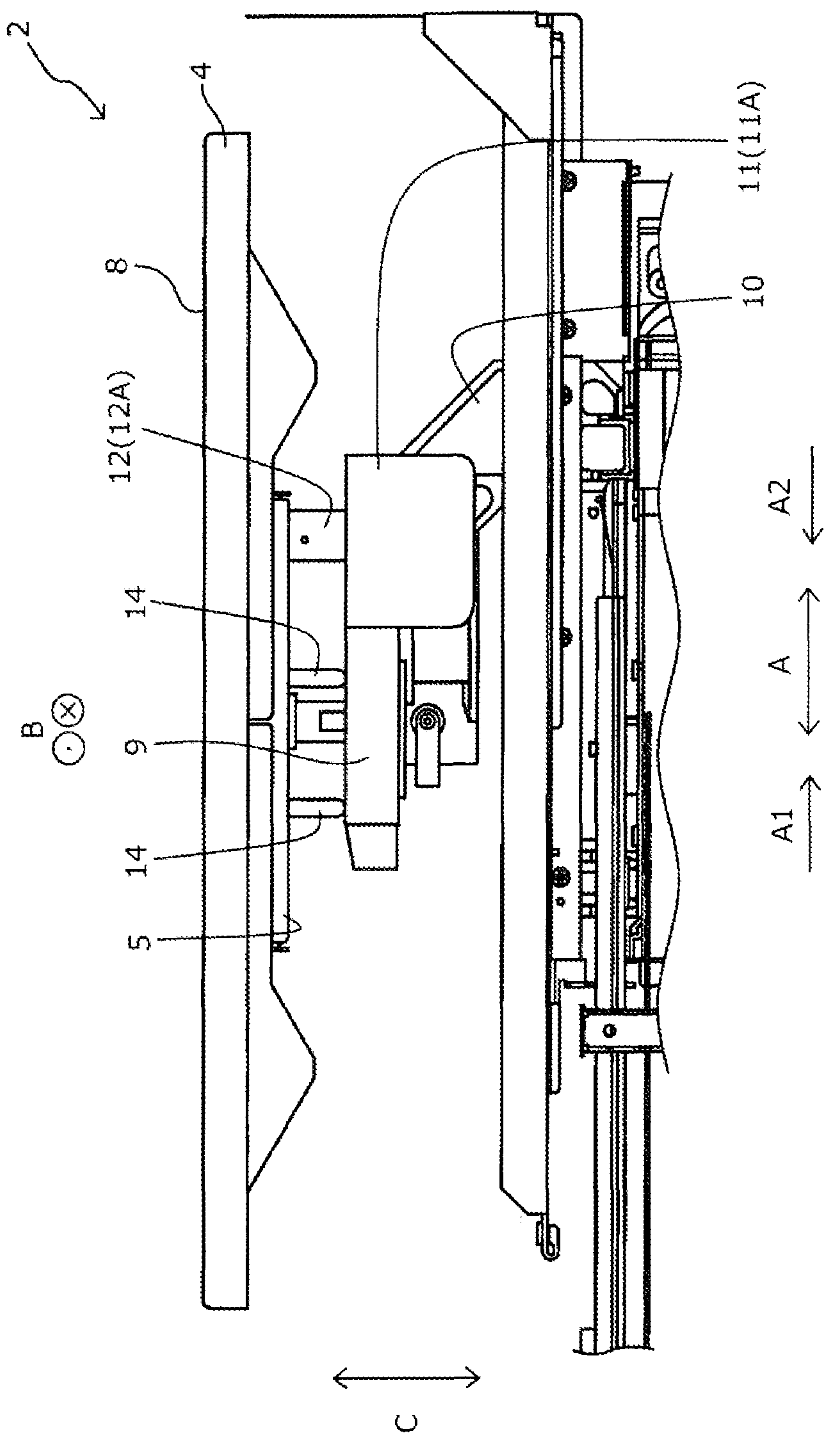
FIG. 5 is a schematic side view illustrating a medium support unit of the recording device according to the example of the present disclosure.
Figure 6:
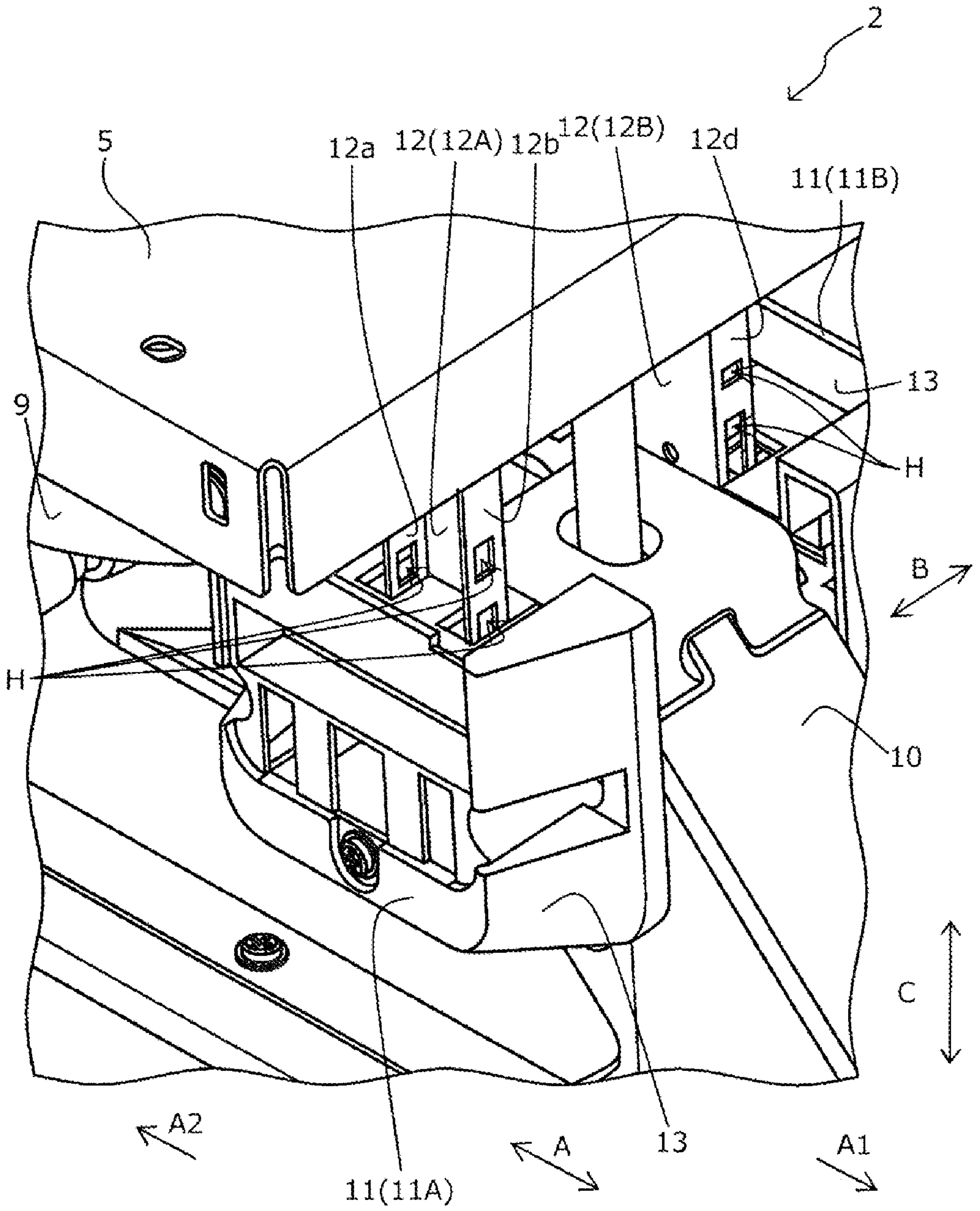
FIG. 6 is a schematic perspective view illustrating a periphery of a tray position detector of the recording device according to the example of the present disclosure.

Here, the tray position detector 11, which is a main component of the recording device 1 according to this example, will be described with reference to FIG. 5 to FIG. 9. FIG. 5 is a schematic side view of the medium support unit 2, which serves as a support portion. As illustrated in FIG. 5, the recording device 1 includes the tray position detectors 11 capable of detecting an object located in a detection range, and detected portions 12 provided so as to be located in the detection range of the tray position detectors 11. In this example, both the tray position detectors 11 and the detected portions 12 are attached to the medium support unit 2. Further, FIG. 6 and FIG. 7 are schematic perspective views illustrating the periphery of the tray position detectors 11 and the detected portions 12. Note that FIG. 6 and FIG. 7 are diagrams viewed from different angles. FIG. 8 is a schematic perspective view illustrating the periphery of the tray position detectors 11. As illustrated in FIG. 6 and FIG. 8, the tray position detectors 11 according to this example include a detector 11A and a detector 11B. In other words, the tray position detectors 11 are provided on both one side and the other side in the width direction B with respect to the center of the medium support unit 2. Further, as illustrated in FIG. 6, FIG. 7, and the like, the detected portions 12 according to this example include a detected portion 12A provided at a position corresponding to the detector 11A, and a detected portion 12B provided at a position corresponding to the detector 11B.

Further, as illustrated in FIG. 6, FIG. 7, and FIG. 8, the tray position detectors 11 according to this example are provided at an arm portion 10 of the medium support unit 2. As illustrated in FIG. 8 and the like, the tray position detectors 11 according to this example include, in addition to the detector 11A the detector 11B, optical sensors S and a holder 13 that holds the optical sensors S. The detector 11A includes an optical sensor SA and an optical sensor SB as the optical sensors S, and the detector 11B includes an optical sensor SC and an optical sensor SD as the optical sensors S.

Figure 9:
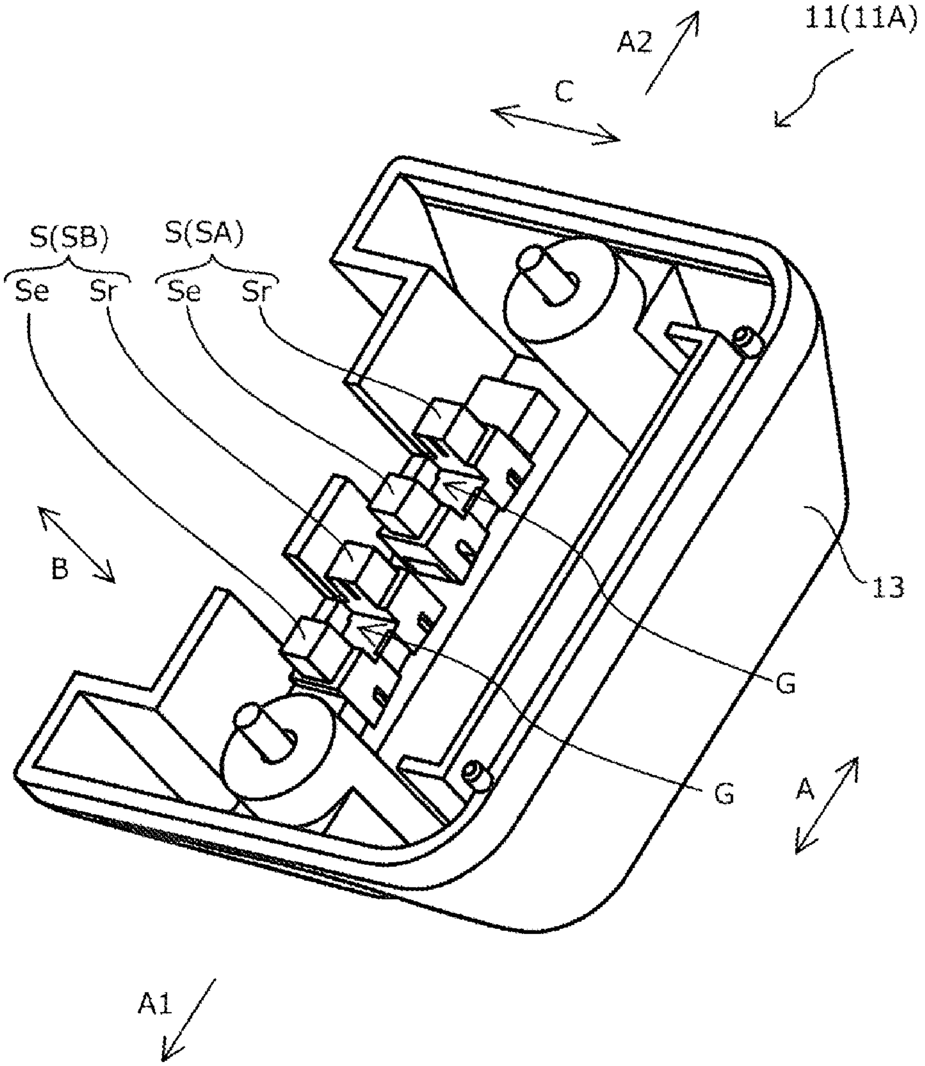
FIG. 9 is a schematic perspective view illustrating the tray position detector of the recording device according to the example of the present disclosure.

Here, FIG. 9 is a schematic perspective view of the tray position detector 11. As illustrated in FIG. 9, each of the optical sensors S includes a light-emitting portion Se and a light-receiving portion Sr. In FIG. 9, the detector 11A is illustrated as an example, but the same configuration applies to the detector 11B. At this time, the light-emitting portion Se is configured to irradiate the light-receiving portion Sr with light. Further, the light-receiving portion Sr is configured to receive the light irradiated from the light-emitting portion Se. Then, each of the optical sensors S is configured to be able to detect whether the detected portion 12 has blocked the light irradiated from the light-emitting portion Se toward the light-receiving portion Sr, in a space G between the light-emitting portion Se and the light-receiving portion Sr.

The detected portions 12 according to this example, namely, both the detected portion 12A and the detected portion 12B have a substantially sideway U-shape, namely, a substantially C-shape when viewed from the facing direction C. The detected portion 12A includes a flat plate portion 12*a* which is provided at a position corresponding to the space G of the optical sensor SA and in which a plurality of hole portions H are formed, and a flat plate portion 12*b* which is provided at a position corresponding to the space G of the optical sensor SB and in which the plurality of hole portions H are formed. Further, the detected portion 12B includes a flat plate portion 12*c* which is provided at a position corresponding to the space G of the optical sensor SC and in which the plurality of hole portions H are formed, and a flat plate portion 12*d* which is provided at a position corresponding to the space G of the optical sensor SD and in which the plurality of hole portions H are formed. Here, regions corresponding to the hole portions H in the flat plate portions 12*a* to 12*d*, respectively, correspond to regions transmitting the light irradiated from the light-emitting portion Se to the light-receiving portion Sr, and regions in which the hole portions H are not provided in the flat plate portions 12*a* to 12*d*, respectively, correspond to regions blocking the light irradiated from the light-emitting portion Se to the light-receiving portion Sr. Therefore, the detected portion 12 is configured to be able to indicate its own position in the facing direction C, based on the presence or absence of the hole portion H.

Since the detected portion 12 has such a configuration, the tray position detector 11 according to this example can detect the position of the detected portion 12 in the facing direction C. Then, because of this, based on the detection result of the tray position detector 11, the controller 25 can identify the position of the tray 4 in the facing direction C.

An example of a method for adjusting the height (position in the facing direction C) of the tray 4 using the recording device 1 according to this example will be described below with reference to flowcharts in FIG. 10 to FIG. 12. Here, the flowcharts in FIG. 10 to FIG. 12 will be described in comparison to flowcharts illustrated in FIG. 13 and FIG. 14 corresponding to a comparative example, which is an example of the method for adjusting the height of the tray 4 that can also be performed by a known recording device. Note that, in the method for adjusting the height of the tray 4, basically, a positional information notification operation of notifying positional information in the facing direction C is performed, and subsequently, a detection result notification operation of notifying information based on the detection result of the medium detector 40 for a checking purpose is performed. The flowcharts in FIG. 10 and FIG. 13 correspond to the positional information notification operation, and the flowcharts in FIG. 12 and FIG. 14 correspond to the detection result notification operation. Further, the flowchart in FIG. 11 corresponds to a provisional detection result notification operation.

Here, an overview of the method for adjusting the height of the tray 4 is described. The purpose of adjusting the height of the tray 4 is to set the gap in the facing direction C between the medium placed on the tray 4 and the recording head 7 to a desired gap. Thus, the tray 4 is adjusted to obtain the desired gap by the tray 4 being gradually shifted from the lower side at which the gap is wider toward the upper side at which the gap is narrower. The reason why the position of the tray 4 is adjusted by the tray 4 being gradually shifted from the lower side toward the upper side is to reduce the possibility of the medium placed on the tray 4 colliding with the recording head 7 as much as possible. Note that, in the method for adjusting the height of the tray 4 according to this example, a preferable gap between the recording head 7 and the medium in the facing direction C is obtained by lowering the tray 4 by two stages with respect to a reference position, which is a height of the medium that can just about be detected by the medium detector 40. However, such a method need not necessarily be employed. Further, in the method for adjusting the height of the tray 4 according to this example, the positional information notification operation, the main purpose of which is to adjust the height of the tray 4, and the detection result notification operation, the main purpose of which is to check whether the height of the tray 4 adjusted by the positional information notification operation is appropriate, are performed. However, in some cases, the provisional detection result notification operation, the main purpose of which is to adjust the height of the tray 4, may be performed together with the positional information notification operation, or instead of the positional information notification operation.

Figure 13:
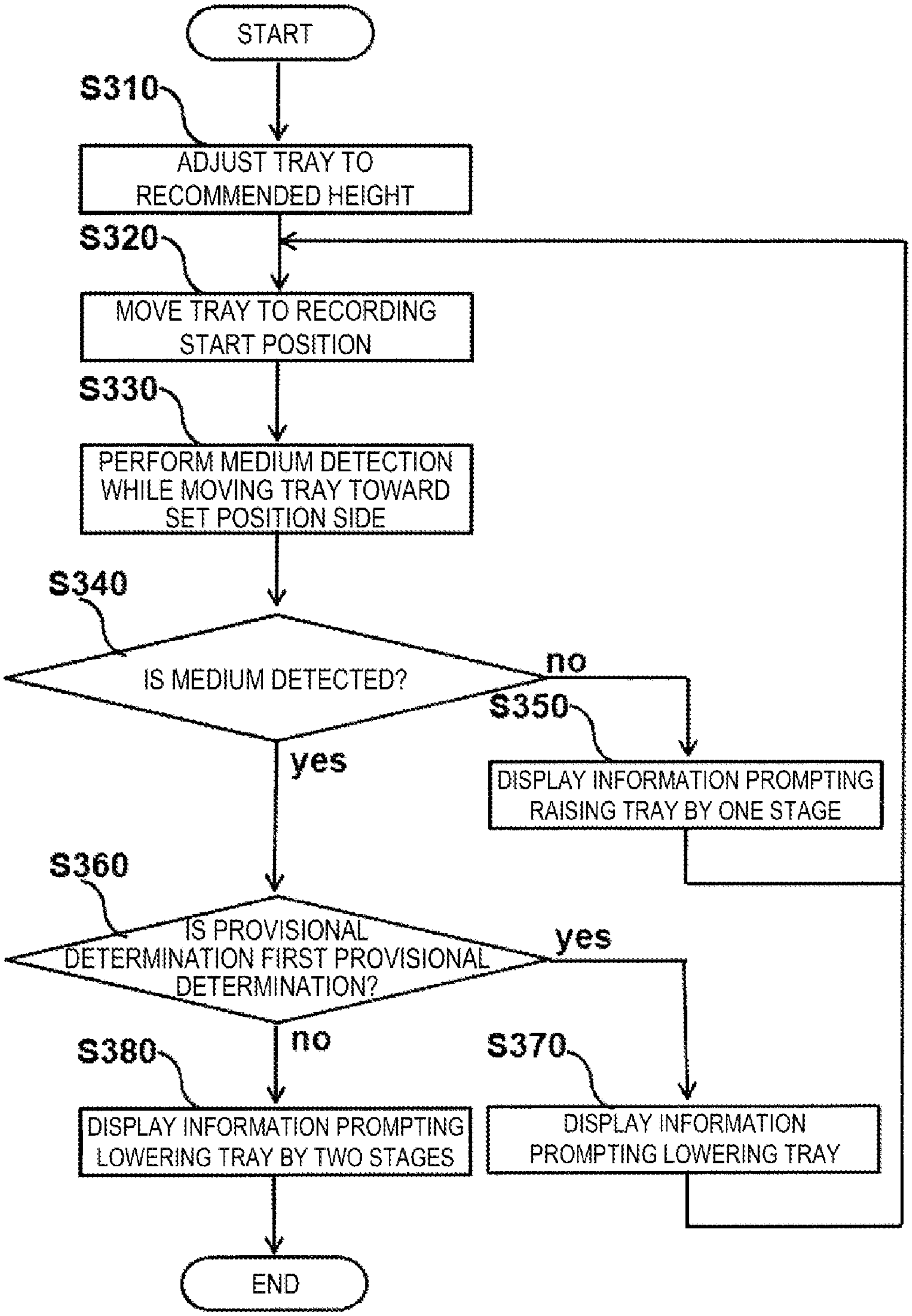
FIG. 13 is a flowchart of a positional information notification operation in a control method for a recording device according to a comparative example.

First, the positional information notification operation illustrated in the flowchart in FIG. 13 is described as the comparative example. The positional information notification operation illustrated in the flowchart in FIG. 13 as the comparative example can be performed by the recording device 1 according to this example, and can also be performed by the known recording device. In the positional information notification operation of the method for adjusting the height of the tray 4 according to the comparative example illustrated in FIG. 13, first, at step S310, the display portion 41*a* is caused to display a recommended height of the tray 4. As illustrated in FIG. 8, the stepped protrusion portion placement portion 15 is formed in the lever 9, and information such as at which stage of the protrusion portion placement portion 15 the protrusion portion 14 is to be placed can be displayed on the display portion 41*a*. The user can perform step S310 at the set position P1, for example.

Subsequently, at step S320, the tray 4 is moved to the recording start position P2. Then, at step S330, the tray 4 is moved by the medium transport unit 3 from the recording start position P2 to the set position P1 in the direction A2. Then, at step S340, the controller 25 checks whether the medium is detected by the medium detector 40 during the movement. Note that, in the positional information notification operation illustrated in the flowchart in FIG. 13, the tray 4 is moved to the recording start position P2, and then the medium detection is performed while moving the tray 4 in the direction A2 to the set position P1 side. However, the medium detection may be performed while moving the tray 4 from the set position P1 to the recording start position P2 side.

At step S340, when the controller 25 determines that the medium has not been detected by the medium detector 40, the controller 25 proceeds to step S350 and causes the display portion 41*a* to display information prompting raising of the stage of the tray 4, namely, raising the placement position of the protrusion portion 14 in the protrusion portion placement portion 15 by one stage (prompting raising of the tray 4 by one stage). After changing the placement position of the protrusion portion 14 to be one stage higher, the user returns to step S320 by advancing the phase by pressing the button 41*b* or the like, and repeats the processing from step S320 to step S340. On the other hand, at step S340, when the controller 25 determines that the medium has been detected by the medium detector 40, the controller 25 proceeds to step S360 and determines whether the positional adjustment of the tray 4 at this time is the first provisional determination, or the positional adjustment of the tray 4 at this time is a provisional determination made after already repeatedly performing the processing from step S320 to step S340 several times. The determination as to whether the positional adjustment of the tray 4 at this time is the first provisional determination can be made using a detection result of a detector that detects the position of the tray 4 in the facing direction C, such as the tray position detector 11 according to this example, or a detection result of a detector that detects the rotation of the lever 9. Specifically, for example, when the medium detection at step S330 is started without detecting any positional change of the tray 4 in the facing direction C after starting the positional information notification operation, the positional adjustment is determined to be the first provisional determination, and otherwise, it is determined that the positional adjustment at this time is not the first provisional determination.

When the controller 25 determines that the positional adjustment of the tray 4 at this time is the first provisional determination at step S360, the controller 25 determines that the position of the tray 4 may be too high with respect to the desired height, and proceeds to step S370 at which the controller 25 causes the display portion 41*a* to display information prompting lowering of the tray 4. Then, by the user advancing the phase by pressing the button 41*b* or the like, the processing returns to step S320. On the other hand, when the controller 25 determines that the positional adjustment of the tray 4 at this time is not the first provisional determination at step S350, the controller 25 determines that the position of the tray 4 is at the desired height, and proceeds to step S380 at which the controller 25 causes the display portion 41*a* to display information prompting lowering of the tray 4 by two stages (lowering the placement position of the protrusion portion 14 in the protrusion portion placement portion 15 by two stages). Then, the controller 25 causes the tray 4 to be moved to the set position P1, and ends the positional information notification operation. Note that, here, as a configuration, it is assumed that the gap between the recording head 7 and the medium in the facing direction C becomes a preferable gap by lowering the tray 4 by two stages with respect to the reference position at which the medium can just about be detected by the medium detector 40.

As each of the steps described above is performed, in the positional information notification operation illustrated in the flowchart in FIG. 13, the processing from step S320 to step S350 needs be repeatedly performed many times. As a result of the processing from step S320 to step S350 being repeatedly performed, the user's workload is increased, and in addition, the tray 4 is caused to reciprocate from the set position P1 to the recording start position P2 many times, which results in lengthening a time required from the start to the end of the positional information notification operation.

Figure 14:
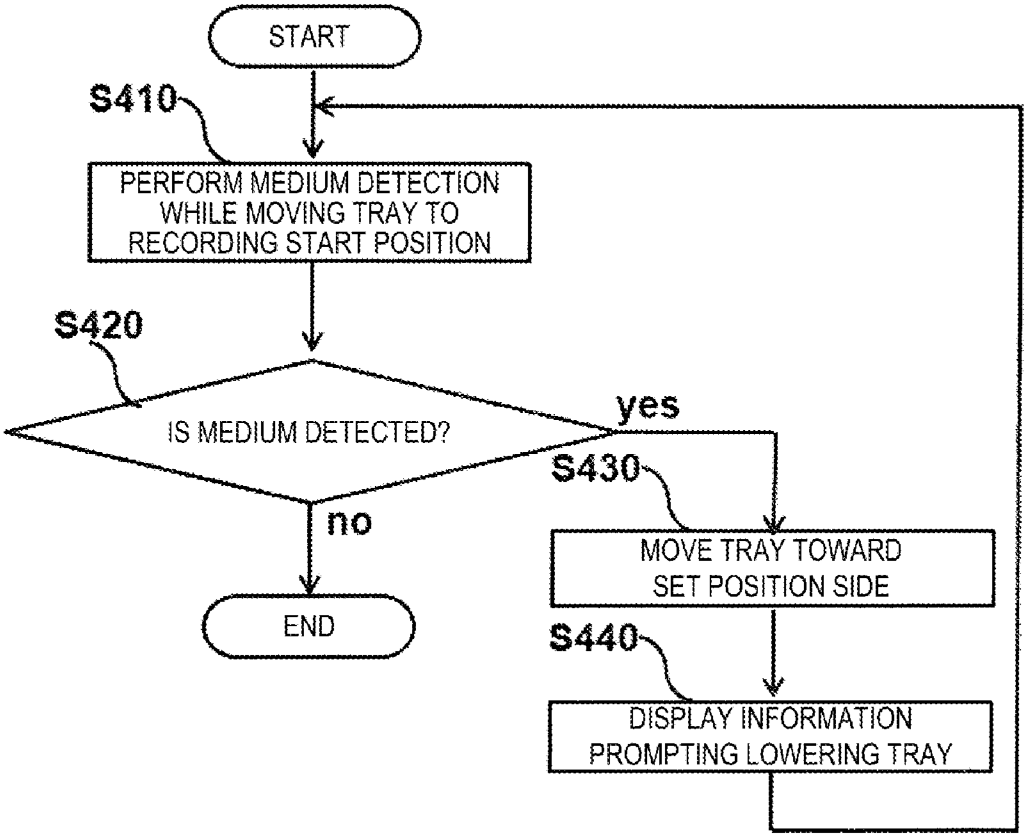
FIG. 14 is a flowchart of a detection result notification operation in the control method for the recording device according to the comparative example.

Next, the detection result notification operation illustrated in the flowchart in FIG. 14 will be described as the comparative example. Similarly to the positional information notification operation illustrated in the flowchart in FIG. 13, the detection result notification operation illustrated in the flowchart in FIG. 14 as the comparative example can be performed by the recording device 1 according to this example, and can also be performed by the known recording device.

As soon as the positional information notification operation ends, the detection result notification operation is started. In the detection result notification operation illustrated in the flowchart in FIG. 14, first, at step S410, the controller 25 checks whether to cause the medium detector 40 to detect the medium while moving the tray 4 in the direction A1 from the set position P1 to the recording start position P2 by the medium transport unit 3. Step S410 corresponds to a step of double-checking whether the medium placed on the tray 4 comes into contact with the recording head 7.

Thus, at step S420 subsequent to step S410, the controller 25 determines whether the medium detector 40 has detected the medium. However, it is normally determined that the medium has not been detected, and the controller 25 ends the detection result notification operation at this point. However, when the controller 25 determines that the medium has been detected by the medium detector 40 at step 420, the controller 25 proceeds to step S430 and causes the tray 4 to be moved to the set position P1 side. After that, at step S440, the controller 25 causes the display portion 41*a* to display the information prompting lowering of the tray 4, returns to step S410, and repeats the processing from step S410 to step S420.

Next, the positional information notification operation according to this example illustrated in the flowchart in FIG. 10 will be described. In the positional information notification operation of the method for adjustment the height of the tray 4 according to this example illustrated in FIG. 10, first, at step S10, the user inputs, via the display portion 41*a*, the buttons 41*b*, or the like, the identification information of the medium to be used, namely, the medium on which the recording is to be performed.

Subsequently, at step S20, based on the correspondence information in which the identification information of the medium stored in the storage 28 and the positional information of the tray 4 in the facing direction C are associated with each other, the controller 25 causes the display portion 41*a* to display a preferable height of the tray 4, namely, a preferable position of the lever 9 corresponding to the input identification information of the medium. Then, at step S30, by the user turning the lever 9 to cause the tray 4 to be located at the height displayed at step S20, the positional information notification operation according to this example illustrated in the flowchart in FIG. 10 is ended. Here, the placement of the medium on the tray 4 may be performed before step S10, may be performed between step S10 and step S20, or may be performed after step S20.

Figure 10:
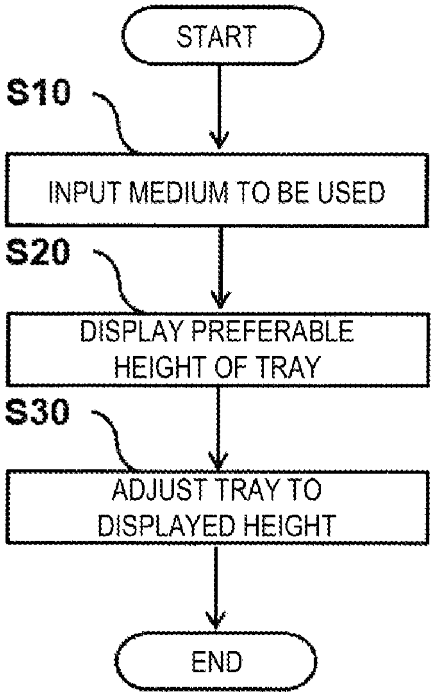
FIG. 10 is a flowchart of a positional information notification operation in a control method for the recording device according to the example of the present disclosure.
Figure 11:
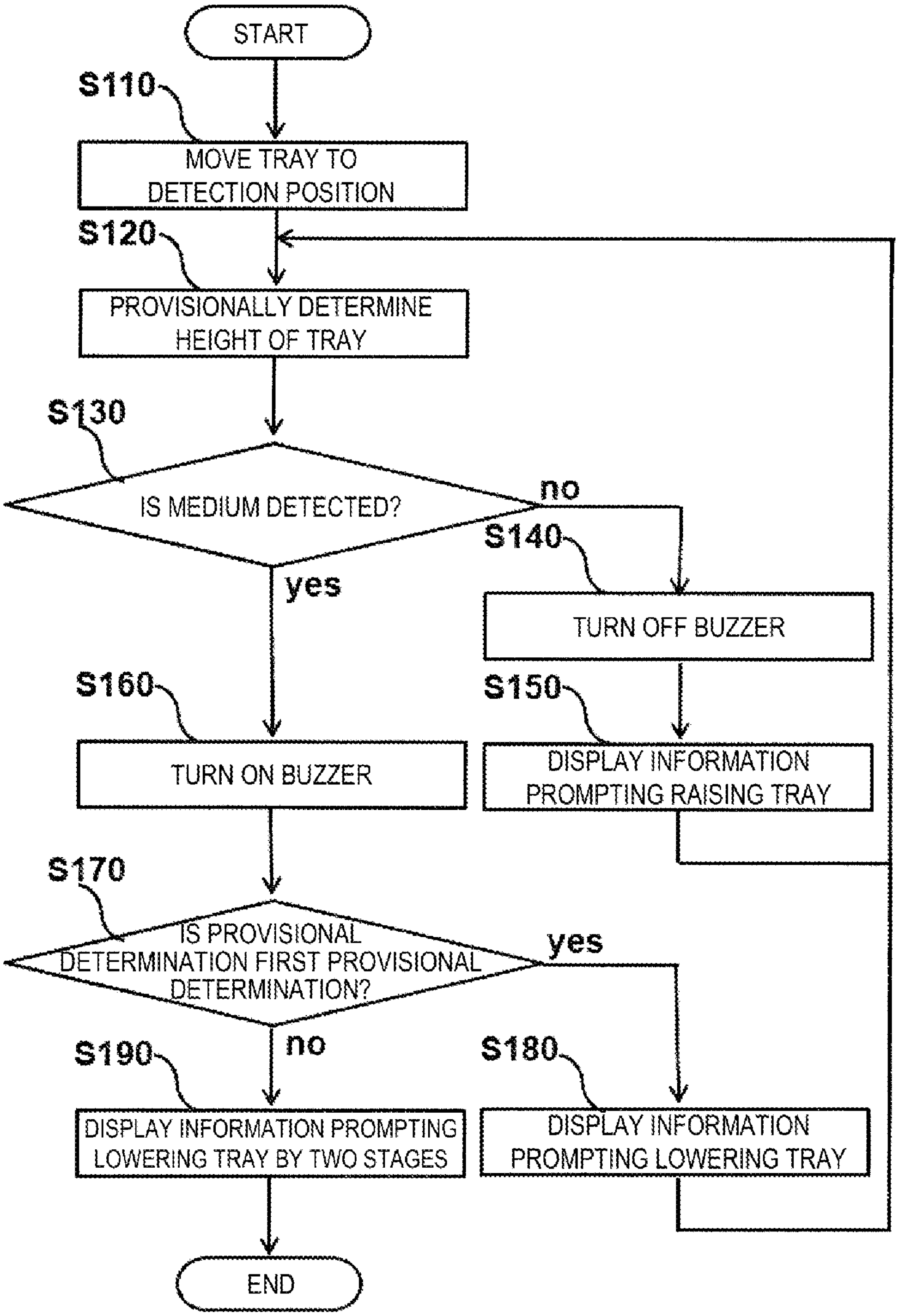
FIG. 11 is a flowchart of a provisional detection result notification operation in the control method for the recording device according to the example of the present disclosure.

Note that, in the recording device 1 according to this example, for example, when the correspondence information relating to the input identification information of the medium is not stored in the storage 28, the provisional detection result notification operation illustrated in the flowchart in FIG. 11 can be performed instead of the positional information notification operation illustrated in the flowchart in FIG. 10. Further, even when the correspondence information relating to the input identification information of the medium is stored in the storage 28, for example, the provisional detection result notification operation illustrated in the flowchart in FIG. 11 can be performed before the positional information notification operation illustrated in the flowchart in FIG. 10.

Thus, the provisional detection result notification operation according to this example illustrated in the flowchart in FIG. 11 will be described below. In the provisional detection result notification operation of the method for adjusting the height of the tray 4 according to this example illustrated in FIG. 11, first, at step S110, the tray 4 on which the medium is set is moved to a detectable position, which is a first position at which at least a portion of the medium placed on the tray 4 overlaps with the detection position of the medium by the medium detector 40 when viewed from the facing direction C. In the positional information notification operation illustrated in the flowchart in FIG. 13, the height adjustment of the tray 4 is performed at the set position P1. On the other hand, in the provisional detection result notification operation according to this example illustrated in the flowchart in FIG. 11, the height adjustment of the tray 4 is performed at the detectable position at which at least the portion of the medium placed on the tray 4 is located at the detection position of the medium by the medium detector 40.

Subsequently, at step S120, the height of the tray 4 is adjusted at the detection position of the medium by the medium detector 40, and the height of the tray 4 is provisionally determined. This step is performed, for example, by the user turning the lever 9 to cause the protrusion portion 14 to be placed at a desired stage of the protrusion portion placement portion 15, and by the user pressing the button 41*b* or the like to cause the processing to proceed to the next phase. The desired stage is determined based on the detection result of the tray position detector 11 and displayed on the display portion 41*a*.

After the provisional determination of the height of the tray 4 at step S120 is completed, a detection operation of the medium is performed at step S130. Specifically, this step is performed by the user setting the medium on the tray 4, and by the controller 25 causing the tray 4 to be moved, using the medium transport unit 3, in the direction A1 from the set position P1 such that at least a portion of the medium is located at the detectable position of the medium detector 40, which is the first position, and checking whether to cause the medium detector 40 to detect the medium. When the medium is not detected at step S130, the processing proceeds to step S140 and step S150 in order, and returns to step S120. At step S140, an off state of the buzzer 42 is maintained, and at step S150, the information prompting the raising of the tray 4 is displayed on the display portion 41*a*. On the other hand, when the medium is detected at step S130, at step S160, the buzzer 42 is turned on to generate a buzzer sound, and the processing proceeds to step S170. Then, at step S170, the controller 25 determines whether the positional adjustment of the tray 4 at this time is the first provisional determination or the provisional determination made after already repeatedly performing the processing from step S120 to step S150 several times. In this example, when the medium is detected, the buzzer 42 is turned on, and when the medium is not detected, the buzzer 42 is turned off, but this configuration may be reversed. Further, after the completion of the processing at step S150 and step S160, information for confirming the completion may be displayed on the display portion 41*a*, and the user may be prompted to enter an input for confirming the displayed information by pressing the button 41*b*, for example.

When the controller 25 determines that the positional adjustment of the tray 4 at this time is the first provisional determination at step S170, the controller 25 determines that the position of the tray 4 may be too high with respect to the desired height and proceeds to step S180 at which the controller 25 causes the display portion 41*a* to display the information prompting lowering of the tray 4. Then, by the user advancing the phase by pressing the button 41*b* or the like, the processing returns to step S120. On the other hand, when the controller 25 determines that the positional adjustment of the tray 4 at this time is not the first provisional determination at step S170, the controller 25 determines that the position of the tray 4 is at the desired height and proceeds to step S190 at which the controller 25 causes the display portion 41*a* to display the information prompting lowering of the tray 4 by two stages, and ends the provisional detection result notification operation. Note that, here again, as a configuration, it is assumed that the gap between the recording head 7 and the medium in the facing direction C becomes the preferable gap by lowering the tray 4 by two stages with respect to the reference position at which the medium can just about be detected by the medium detector 40. The determination by the controller 25 as to whether the positional adjustment of the tray 4 is the first provisional determination is made based on a detection result obtained by the tray position detector 11 detecting whether the position of the tray 4 in the facing direction C has changed since the provisional detection result notification operation is started.

Note that, also in the provisional detection result notification operation illustrated in the flowchart in FIG. 11, similarly to the positional information notification operation illustrated in the flowchart in FIG. 13, in some cases, the processing from step S120 to step S150 needs to be repeated. However, since the height of the tray 4 can be adjusted continuously without moving the tray 4 from the detectable position, the workload of the user is reduced, and at the same time, the lengthening of the processing time is also suppressed.

Next, the detection result notification operation according to this example illustrated in the flowchart in FIG. 12 will be described. For example, as soon as the user confirms the completion of the positional information notification operation illustrated in the flowchart in FIG. 10 or the provisional detection result notification operation illustrated in the flowchart in FIG. 11, the detection result notification operation is started. In the detection result notification operation illustrated in the flowchart in FIG. 12, first, at step S210, the tray 4 is moved from the detectable position to the recording start position P2 by the medium transport unit 3.

Subsequently, at step S220, the controller 25 checks whether to cause the medium detector 40 to detect the medium while moving the tray 4 to the set position P1 side (in the direction A2). Step S220 corresponds to the step of double-checking whether the medium placed on the tray 4 comes into contact with the recording head 7.

Thus, at step S230 subsequent to step S220, the controller 25 determines whether the medium detector 40 has detected the medium. However, it is normally determined that the medium has not been detected, and the controller 25 ends the detection result notification operation at this point. However, when the controller 25 determines that the medium has been detected by the medium detector 40 at step 230, the controller 25 proceeds to step S240 and causes the display portion 41*a* to display the information prompting the lowering of the tray 4. Then, after requesting the user to input an instruction for confirmation, the controller 25 returns to step S210, and repeats the processing from step S210 to step S230.

Figure 12:
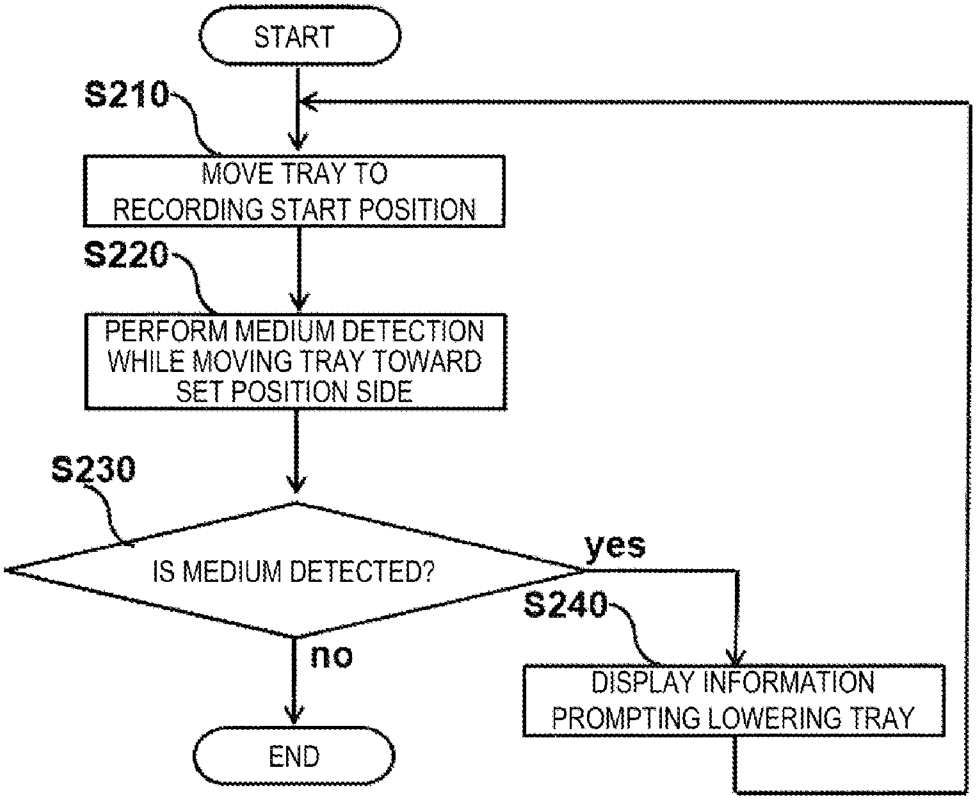
FIG. 12 is a flowchart of a detection result notification operation in the control method for the recording device according to the example of the present disclosure.

In the example described above, the detection result notification operation illustrated in the flowchart in FIG. 12 is performed subsequently to the positional information notification operation illustrated in the flowchart in FIG. 10 or the provisional detection result notification operation illustrated in the flowchart in FIG. 11. However, the detection result notification operation illustrated in the flowchart in FIG. 14 can also be performed subsequently to the positional information notification operation illustrated in the flowchart in FIG. 10 or the provisional detection result notification operation illustrated in the flowchart in FIG. 11. Furthermore, subsequently to the positional information notification operation illustrated in the flowchart in FIG. 10 or the provisional detection result notification operation illustrated in the flowchart in FIG. 11, the tray 4 may be temporarily returned to the set position P1, which is an initial position of the tray 4, and the medium detection may be performed while moving the tray 4 from the set position P1 to the recording start position P2 in the direction A1. In other words, the detection result notification operation of double-checking whether the medium placed on the tray 4 comes into contact with the recording head 7 may be performed while moving the tray 4 from the detectable position to the recording start position P2 in the direction A1, may be performed, after once returning the tray 4 to the set position P1, while moving the tray 4 from the set position P1 to the recording start position P2 in the direction A1, or may be performed while moving tray 4 from the recording start position P2 to the set position P1 in the direction A2.

A supplementary description will be given below to each of the steps of the positional information notification operation illustrated in the flowchart in FIG. 10, the provisional detection result notification operation illustrated in the flowchart in FIG. 11, and the detection result notification operation illustrated in the flowchart in FIG. 12. As described above, the control method for the recording device according to this example is a control method for the recording device 1 that includes the recording head 7 that performs the recording on the medium, the tray 4 whose position is adjustable in the facing direction C, which is the first direction, and which is movable in the movement direction A, which is a second direction including a position at which the medium placed on the tray 4 faces the recording head 7 in the facing direction C and intersecting the facing direction C, the lever 9 that adjusts the position of the tray 4 in the facing direction C, the medium transport unit 3 that moves the tray 4 in the movement direction A, the medium detector 40 that can detect, at the detection position within the movement range of the tray 4 moved by the medium transport unit 3, whether the medium placed on the tray 4 is at the reference position in the facing direction C, the display portion 41*a* and the buttons 41*b* that receive an input, the display portion 41*a* that notifies information, and the storage 28 that stores the correspondence information in which the identification information of the medium and the positional information of the tray 4 in the facing direction C are associated with each other.

Then, in the positional information notification operation, when adjusting the position of the tray 4 in the facing direction C, the identification information of the medium that is input via the display portion 41*a* and the buttons 41*b* at step S10 and the correspondence information stored in the storage 28 are displayed on the display portion 41*a* at step S20.

Further, in the detection result notification operation, at step S220, in accordance with an instruction from the user received via the display portion 41*a* and the buttons 41*b* after the completion of the positional information notification operation, the tray 4 is moved by the medium transport unit 3 such that the entire region in the movement direction A of the tray 4 passes through the detection position, and the medium detector 40 is caused to detect whether the medium is at the reference position when the medium is passing through the detection position. Further, at step S240, the display portion 41*a* is caused to display the information prompting the lowering of the tray 4 by one stage, as information based on the detection result of the medium detector 40.

In this manner, in the control method for the recording device according to this example, when adjusting the position of the tray 4 in the facing direction C in the positional information notification operation, the identification information of the medium that is input via the display portion 41*a* and the buttons 41*b*, and the correspondence information stored in the storage 28 are notified by the display portion 41*a*, which serves as a notification portion. In other words, by performing the control method for the recording device according to this example, the height adjustment of the tray 4 can be started from a position close to an appropriate height of the tray 4. Thus, the number of reciprocating movements of the tray 4 in the movement direction A and the like can be reduced, and the workload of the user associated with the height adjustment of the tray 4 can thus be reduced.

Note that, from the perspective of the recording device, the recording device 1 according to this example includes the controller 25. By the controller 25 controlling the control method for the recording device described above, the height adjustment of the tray 4 can be completed without causing the tray 4 to reciprocate in the movement direction A many times, and the workload of the user associated with the height adjustment of the tray 4 can thus be reduced.

Note that, in the recording device 1 according to this example, the storage 28 stores a setting condition of a post-processing device that performs post-processing on the medium on which the recording has been performed by the recording head 7. Then, the controller 25 can cause the display portion 41*a* to display the setting condition. Thus, by using the recording device 1 according to this example, the user can swiftly start the post-processing using the post-processing device under appropriate conditions. Note that the post-processing by the post-processing device is not particularly limited, and examples of the post-processing by the post-processing device include heating processing by a drying device that dries inks recorded on the medium.

Further, in the recording device 1 according to this example, the controller 25 can update the correspondence information and cause the storage 28 to store the correspondence information. As described above, the storage 28 includes the EEPROM or the like, and can store the updated correspondence information in the EEPROM or the like. Thus, by using the recording device 1 according to this example, for example, when more preferable correspondence information than the correspondence information stored in the storage 28 is found, the user can adjust the height of the tray 4 under more preferable conditions.

Further, as described above, the recording device 1 according to this example can perform the provisional detection result notification operation illustrated in the flowchart in FIG. 11, for example, before performing the positional information notification operation illustrated in the flowchart in FIG. 10. Then, in the provisional detection result notification operation, when adjusting the position of the tray 4 in the facing direction C at step S110, after performing the positional information notification operation and before performing the detection result notification operation, in accordance with the instruction received by the display portion 41*a* and the buttons 41*b*, the tray 4 is moved by the medium transport unit 3 to the detectable position, which is the first position, such that at least a portion of the tray 4 is located at the detection position. Further, at step S130, the medium detector 40 is caused to detect, at the detectable position, whether the medium is at the reference position. Further, in the processing from step S140 to step S160, the information based on the detection result of the medium detector 40 is notified by the buzzer 42 and the display portion 41*a*, both of which serve as the notification portion. In other words, the tray 4 can be moved to the first position, and the height adjustment of the tray 4 can be completed at the first position. Thus, with the recording device 1 according to this example, the height adjustment of the tray 4 can be completed without causing the tray 4 to reciprocate in the movement direction A many times, and the workload of the user associated with the height adjustment of the tray 4 can thus be reduced.

Further, after performing the positional information notification operation illustrated in the flowchart in FIG. 10 and before performing the detection result notification operation illustrated in the flowchart in FIG. 12, the controller 25 can cause the display portion 41*a* to display information prompting performing of the provisional detection result notification operation illustrated in the flowchart in FIG. 11. Thus, when the user is intending to perform the provisional detection result notification operation, it is possible to prevent the user from forgetting to perform the provisional detection result notification operation.

Further, when a non-stored medium, for which the identification information is not stored in the storage 28, is used as the medium, the controller 25 can cause the display portion 41*a* to display the information prompting performing of the provisional detection result notification operation. Therefore, when the non-stored medium is used, for example, instead of performing the positional information notification operation, the provisional detection result notification operation can be performed. Thus, even when the non-stored medium is used, the workload associated with the height adjustment of the tray 4 can be reduced.

Further, as described above, the recording device 1 according to this example is provided with the tray position detector 11 that can detect the position of the tray 4 in the facing direction C, but after the medium detector 40 detects whether the medium is at the reference position at step S130 of the provisional detection result notification operation, at step S180, the controller 25 can cause the display portion 41*a* to display information prompting adjustment of the position of the tray 4 using the lever 9 until the position of the tray 4 detected by the tray position detector 11 is at a position separated from the reference position by a first gap in the downward direction. Thus, the recording device 1 according to this example can adjust the position of the tray 4 in the facing direction C using the detection result of the tray position detector 11. Alternatively, at step S190, the display portion 41*a* can be caused to display the information prompting adjustment of the position of the tray 4 using the lever 9 until the position of the tray 4 detected by the tray position detector 11 is at a position lowered by two stages, which is the position separated by the first gap.

Note that the disclosure is not limited to the aforementioned example, and many variations are possible within the scope of the disclosure as described in the appended claims. It goes without saying that such variations also fall within the scope of the disclosure.

What is claimed is:

1. A recording device comprising:

a placement portion configured to support a medium;

a recorder configured to perform recording on the medium supported by the placement portion;

an adjustment mechanism configured to adjust a position of the placement portion in a first direction being a direction in which the recorder and the placement portion face each other;

a movement mechanism configured to move the placement portion in a second direction being a direction intersecting the first direction;

a medium detector configured to detect, at a detection position within a movement range of the placement portion moved by the movement mechanism, whether the medium placed at the placement portion is located at a reference position in the first direction;

an input portion configured to receive an input;

a notification portion configured to notify information;

a storage configured to store correspondence information in which identification information of the medium and positional information of the placement portion in the first direction are associated with each other; and a controller; wherein when the position of the placement portion in the first direction is adjusted, the controller performs a positional information notification operation of causing the notification portion to notify positional information of the placement portion in the first direction based on the identification information of the medium, input by the input portion, and the correspondence information stored in the storage, and after the positional information notification operation, a detection result notification operation including causing the movement mechanism to move the placement portion in accordance with a first instruction received by the input portion, so that an entire region in the second direction of the placement portion passes through the detection position, causing the medium detector to detect whether the medium is located at the reference position during when the medium is passing through the detection position, and causing the notification portion to notify information based on a result of the detection by the medium detector.

2. The recording device according to claim 1, wherein the storage stores a setting condition of a post-processing device configured to perform post-processing on the medium on which the recording is performed by the recorder, and the controller causes the notification portion to notify the setting condition.

3. The recording device according to claim 1, wherein the controller is configured to update the correspondence information and cause the storage to store the correspondence information.

4. The recording device according to claim 1, wherein when the position of the placement portion in the first direction is adjusted, after performing the positional information notification operation and before the detection result notification operation, the controller is configured to perform a provisional detection result notification operation including causing the movement mechanism to move the placement portion to a first position in accordance with a second instruction received by the input portion, so that at least a part of the placement portion is located at the detection position, causing the medium detector to detect at the first position whether the medium is located at the reference position, and causing the notification portion to notify information based on a result of the detection by the medium detector.

5. The recording device according to claim 4, wherein after performing the positional information notification operation and before the detection result notification operation, the controller causes the notification portion to notify information prompting execution of the provisional detection result notification operation.

6. The recording device according to claim 4, wherein when a non-stored medium storing no identification information in the storage is used as the medium, the controller causes the notification portion to notify information prompting execution of the provisional detection result notification operation.

7. The recording device according to claim 4, comprising a placement portion detector configured to detect a position of the placement portion in the first direction, wherein the controller causes the notification portion to notify information prompting adjustment of the position of the placement portion by the adjustment mechanism after the medium detector detects, in the provisional detection result notification operation, that the medium is located at the reference position, and until the position, detected by the placement portion detector, of the placement portion is located at a position separated from the reference position by a first gap in a direction away from the recorder.

8. A control method for a recording device, the recording device including:

a placement portion configured to support a medium;

a recorder configured to perform recording on the medium supported by the placement portion;

an adjustment mechanism configured to adjust a position of the placement portion in a first direction being a direction in which the recorder and the placement portion face each other;

a movement mechanism configured to move the placement portion in a second direction being a direction intersecting the first direction;

a medium detector configured to detect, at a detection position within a movement range of the placement portion moved by the movement mechanism, whether the medium placed at the placement portion is located at a reference position in the first direction;

an input portion configured to receive an input;

a notification portion configured to notify information; and a storage configured to store correspondence information in which identification information of the medium and positional information of the placement portion in the first direction are associated with each other, the control method comprising:

when the position of the placement portion in the first direction is adjusted, performing a positional information notification operation of causing the notification portion to notify positional information of the placement portion in the first direction based on identification information, input by the input portion, of the medium and the correspondence information stored in the storage; and performing, after the positional information notification operation, a detection result notification operation including causing the movement mechanism to move the placement portion in accordance with an instruction received by the input portion, so that an entire region in the second direction of the placement portion passes through the detection position, causing the medium detector to detect whether the medium is located at the reference position during when the medium is passing through the detection position, and causing the notification portion to notify information based on a result of the detection by the medium detector.

* * * * *